(12) United States Patent
Rzadki et al.

(10) Patent No.: US 7,429,201 B2
(45) Date of Patent: *Sep. 30, 2008

(54) FRIGATE SHIP-TYPE EQUIPMENT SYSTEM

(75) Inventors: Wolfgang Rzadki, Glinde (DE);
Karl-Otto Sadler, Hamburg (DE);
Matthias Schulze, Lüneburg (DE);
Hannes Schulze Horn, Gladbeck (DE)

(73) Assignee: Siemens Aktiengesellschaft, Munich (DE)

( * ) Notice: Subject to any disclaimer, the term of this patent is extended or adjusted under 35 U.S.C. 154(b) by 16 days.

This patent is subject to a terminal disclaimer.

(21) Appl. No.: 10/527,713

(22) PCT Filed: Sep. 12, 2003

(86) PCT No.: PCT/DE03/03034

§ 371 (c)(1),
(2), (4) Date: Jan. 30, 2006

(87) PCT Pub. No.: WO2004/026684

PCT Pub. Date: Apr. 1, 2004

(65) Prior Publication Data

US 2006/0166568 A1 Jul. 27, 2006

(30) Foreign Application Priority Data

Sep. 14, 2002 (DE) .......................... 202 14 297 U (51) Int. Cl.
*B60L 11/00* (2006.01)
(52) U.S. Cl. .................................................. 440/6
(58) Field of Classification Search ................ 114/1, 114/56.1, 65 R; 440/3, 6, 38
See application file for complete search history.

(56) References Cited

U.S. PATENT DOCUMENTS 3,943,876 A * 3/1976 Kiekhaefer .................. 440/43

(Continued)

FOREIGN PATENT DOCUMENTS

DE 100 19 352 A 6/2001

(Continued)

OTHER PUBLICATIONS

Translation of WO 02057132.*

(Continued)

*Primary Examiner*—Stephen Avila
(74) *Attorney, Agent, or Firm*—Harness, Dickey & Pierce P.L.C.

(57) ABSTRACT

A frigate ship-type equipment system includes standard equipment segments, such as an energy generator, an energy distributor, a drive and an automation segment, also includes a hull which is adapted to the large and specific requirements of the frigate ship-type equipment system. In order to construct standard equipment segments for a frigate ship-type equipment system which is technically and constructively simple and economical in terms of cost, at least one of the standard-equipment segments, such as the energy generator and/or the energy distributor and/or the drive and/or the automation segment is constructed from the standard units or components which correspond to the requirements of the frigate ship-type equipment system and which are arranged in the hull of the ship and which can be built into the hull of the ship body according to equipping systems for various ship types.

9 Claims, 4 Drawing Sheets

U.S. PATENT DOCUMENTS

| | | | | |
|---|---|---|---|---|
| 4,553,493 | A | * | 11/1985 | Sadler et al. ............... 114/1 |
| 4,678,439 | A | * | 7/1987 | Schlichthorst ............ 440/11 |
| 5,417,597 | A | | 5/1995 | Levedahl |
| 6,837,758 | B2 | * | 1/2005 | Drefs et al. ............... 440/6 |
| 7,099,755 | B2 | * | 8/2006 | Mueller et al. ............ 701/21 |
| 2002/0121837 | A1 | * | 9/2002 | Dombrovski et al. ..... 310/261 |
| 2005/0009418 | A1 | * | 1/2005 | Ries et al. ................ 440/6 |
| 2005/0037242 | A1 | * | 2/2005 | Rzadki et al. ............ 429/12 |

FOREIGN PATENT DOCUMENTS

| | | |
|---|---|---|
| DE | 100 19 352 A1 | 6/2001 |
| DE | 101 04 892 A | 8/2002 |
| DE | 101 04 892 A1 | 8/2002 |
| WO | WO 02/057132 A1 | 7/2002 |
| WO | WO 02 057132 A1 | 7/2002 |

OTHER PUBLICATIONS

Dreger W: "Entwicklungstendenzen Beim Bau Zukuenftiger Korvetten Und Fregatten", Schiff Und Hafen, Seehafen-Verlag Erik Blumenfeld. Hamburg, DE, vol. 53, No. 4, Apr. 2001, pp. 47-52, XP001112254, ISSN: 0938-1643.

Ehrenberg H D: "Gebaute Einheiten Und Neueste Entwicklungen", Schiff Und Hafen, Seehafen-verlag Erik Blumenfeld, Hamburg, DE, vol. 48, No. 12, Dec. 1, 1996, pp. 37-38, XP000641578, ISSN: 0938-1643.

"Holeby Wins Design Award for Modular Genset Engine", Marine Engineers Review, Institute of Marine Engineers. London, GB, Apr. 1, 1996, p. 26, XP000584287, ISSN: 0047-5955.

Mahn B. et al., "Codag-Antriebsanlage Auf Fregatte F124", Schiff Und Hafen, Seehafen-Verlag Erik Blumenfeld. Hamburg, DE, vol. 50, No. 3, Mar. 1, 1998, p. 61-64, XP000750509.

Hirt M. et al., "Wirtschaftliche Und Technisch Optimierte Getriebe in Fregatten Und Korvetten", Schiff Und Hafen, Seehafen-Verlag Erik Blumenfeld. Hamburg, DE, vol. 50, No. 5, May 1, 1998, pp. 61-63, XP000750534, ISSN: 0938-1643.

Gamble B. And Goldman J.: "High temperature superconducting motors and generators fo submarines and surface ships", Proceedings Naval Symposium on Electic Machines, Jul. 28-28, 1997, pp. 275-282, XP008000614, newport, USA. p. 275, p. 282.

Sharke P: "The Hunt for Compact Power", Geophysics, Society of Exploration Geophysicists. The American Society of Mechanical Engineering., Apr. 2000, page Complete XP008000664, Tulsa, USA ISSN: 0016-8033.

International Search Report, International Preliminary Examination Report and German Translation Aid.

Dreger W: "Entwicklungstendenzen beim Bau zuknftiger Korvetten und Fregatten", Schiff und Hafen, seehafen-Verlag Erik Blumenfeld, Hamburg, DE, Bd. 53, Nr. 4, Apr. 2001, Seiten 47-52, XP001112254, ISSN: 0938-1643.

Ehrenberg H D: "Gebaute Einheiten und neueste Entwicklungen", Schiff und Hafen, Seehafen-Verlag Erik Blumenfeld, Hamburg, DE, Bd. 48, Nr. 12, Dec. 1, 1996, Seiten 37-38, XP000641578, ISSN: 0938-1643.

"Holeby Wins Design Award for Modular Genset Engine", Marine Engineers Review, Institute of Marine Engineers, London, GB, Apr. 1, 1996, Seite 26, XP000584287, ISSN: 00475955.

Mahn B et al: "CODAG-Antriebsanlage auf Fregatte F124", Schiff und Hafen, Seehafen-Verlag Erik Blumenfeld, Hamburg, DE, Bd. 50, Nr. 3, A. Mar. 1, 1998, Seiten 61-64, XP000750509, ISSN: 0938-1643.

Hirt M et 1: "Wirtschaftliche und technisch optimierte Getriebe in Fregatten und Korvetten", Schiff und Hafen, Seehafen-Verlag Erik Blumenfeld, Hamburg, DE, Bd. 50, Nr. 5, May 1, 1998, Seiten 61-63, XP000750534, ISSN: 0938-1643.

Gambre B. And Goldman J: "High temperature superconducting motors and generators for submarines and surface ships", Proceedings Naval Symposium on Electric Machines, Jul. 28-28, 1997, Seiten 275-282, XP008000814, Newport, USA.

Sharke P: "The Hunt For Compact Power", Geophysics, Society of Exploration Geophasicists, The American Society of Mechanical Engineering, Apr. 2000, Seite complete, XP008000664, Tulsa, USA, ISSN: 0016-8033.

* cited by examiner

FRIGATE SHIP-TYPE EQUIPMENT SYSTEM

This application is the national phase under 35 U.S.C. § 371 of PCT International Application No. PCT/DE2003/003034 which has an International filing date of Sep. 12, 2003, which designated the United States of America and which claims priority on German Patent Application number DE 202 14 297.3 filed Sep. 14, 2002, the entire contents of which are hereby incorporated herein by reference.

FIELD OF THE INVENTION

The invention generally relates to a "frigate" vessel-type equipment system having standard equipment segments, such as a power generator segment, a power distribution segment, a propulsion segment and an automation segment, and having a vessel hull which is matched to the "frigate" vessel-type equipment system on a size and requirement-specific basis.

BACKGROUND OF THE INVENTION

WO 02/057132 A1 discloses a navy vessel which is designed such that it satisfies the present-day requirements for low emissions, while furthermore ensuring a high degree of survivability in the event of battle damage.

SUMMARY OF THE INVENTION

An embodiment of the invention includes an object of providing a "frigate" vessel-type equipment system having standard equipment segments, which can be produced with less engineering effort and at a lower cost.

According to an embodiment of the invention, an object may be achieved in that at least one standard equipment segment, such as the power generator segment and/or the power distribution segment and/or the propulsion segment and/or the automation segment, is formed from standard units or components which are arranged in accordance with the requirements in the vessel hull of the "frigate" vessel-type equipment system, and which can be installed in vessel hulls of different vessel-type equipment systems.

As such, the individual components of the segments mentioned above—owing to the greater possible quantities—can be produced with considerably less technical/design effort, and thus also at a considerably lower cost. Furthermore, the standardization of the units and components which form the power generator segment and/or the power distribution segment and/or the propulsion segment and/or the automation segment of the "frigate" vessel-type equipment system results in a considerable reduction in the necessary training and incorporation measures.

According to one advantageous embodiment of the "frigate" vessel-type equipment system according to an embodiment of the invention, its propulsion segment has two POD propulsion segments and two waterjet propulsion segments, with the two first segments preferably being designed as completely electrical lightweight POD propulsion systems, preferably having a power of 6 to 8,in particular 7 MW, and with the two latter segments preferably being designed as twin waterjet propulsion systems and preferably having a power of 12 to 16, in particular 14 (2×7), MW.

Furthermore, the propulsion segment may include a thruster segment, which is preferably in the form of a 0.5 MW bow jet thruster.

In order to design the POD propulsion segments and/or the waterjet propulsion segments and/or the thruster segment with weights that are as low as possible and dimensions that are as small as possible, it is expedient for their electric motors to be designed with windings composed of high-temperature superconductors.

According to a further advantageous embodiment of the "frigate" vessel-type equipment system according to the invention, the electric motors of the POD propulsion segments and/or of the waterjet propulsion segments and/or of the thruster segment are in the form of synchronous machines with a field winding composed of high-temperature superconductors, and with the stator windings being in the form of air-gap windings. If the waterjet propulsion segments are equipped with a coaxial exhaust-gas nozzle segment, it is possible to dissipate exhaust gases from internal combustion engines, such as gas turbines or diesel engines, for propulsion of electrical power generating machines and possibly further systems through the waterjet propulsion segments into the water surrounding the "frigate" vessel-type equipment system, so that the detectable thermal emissions from the "frigate" vessel-type equipment system are considerably reduced.

If the "frigate" vessel-type equipment system is designed with an overall length of approximately 138 m, an overall width of approximately 17.5 m and a type displacement of approximately 5500 tonnes, its two POD propulsion segments are expediently arranged in the stern area of the vessel, approximately at frame 7.5 m and approximately 5.50 m from the stern post, amidships.

In order to prevent the POD propulsion segments and the waterjet propulsion segments from being disadvantageously influenced when they are operated at the same time, the distance in the longitudinal direction between the center of the POD propulsion segments or the nose at their traction propellers on the one hand, and the water outlet opening of the pods of the waterjet propulsion segments on the other hand is at least 25 m or 22 m, and advantageously approximately 35 m or 32 m.

According to one advantageous embodiment of the vessel hull of the "frigate" vessel-type equipment system according to the invention, the vessel hull is designed structurally in the stern vessel area, preferably as far as approximately frame 26 to 27, such that it has the strength to absorb the weight of the two POD propulsion segments of, for example, each weighing approximately 65 tonnes and the weight of the associated equipment, such as converters, controllers, etc. of, for example, approximately 20 to 30 tonnes, as well as the axial forces that occur as a result of the operation of the two POD propulsion segments.

If the weight of the two POD propulsion segments as well as that of the associated units of, for example, approximately 150 to 160 tons is compensated for by the arrangement of heavy equipment modules, for example a 32-cell missile launcher, in the bow area of the vessel, it is possible to avoid the shape of the vessel hull having to be broadened in the stern area of the vessel, thus avoiding a serious change to the displacement curve.

The power generator segment of the "frigate" vessel-type equipment system according to an embodiment of the invention advantageously includes fuel cell segments and generator segments, with four air-breathing PEM fuel cells advantageously being used as the fuel cell segments, and two gas-turbine-powered generators advantageously being used as the generator segments. Each PEM fuel cell expediently has a power of approximately 4.5 MW (net) and 6 MW (gross); and the two gas-turbine-powered generators advantageously each have a power of approximately 16 MW.

In order to ensure that the fuel-cell segments start up in emergency situations, the power generator segment should additionally have high-power batteries, designed with an appropriate energy capacity.

In order to make it possible to design the gas-turbine-powered generators with the necessary dimensions and the necessary weight, it is expedient for these generators to be equipped with windings composed of high-temperature superconductors.

According to a further advantageous embodiment of the "frigate" vessel-type equipment system according to the invention, its generators are in the form of synchronous machines with a field winding composed of high-temperature superconductors, with the stator winding being in the form of an air-gap winding. Two diesel reformers, each with a power of approximately 9 MW, are expediently provided in order to supply the hydrogen to the four air-breathing PEM fuel cells.

In order to improve the survivability of the "frigate" vessel-type equipment system, it is advantageous for its power generator segment to be distributed over two or more vessel protection areas of the "frigate" vessel-type equipment system.

Expediently, a first electrical system having two air-breathing PEM fuel cells is arranged in a stern-end first vessel protection area, preferably close to the transition to a midships, second vessel protection area.

In a corresponding manner, a second electrical system, which is subdivided into a stern-end electrical system section having two gas turbines and a bow-end electrical system section having the generators, can be arranged in a midships, second vessel protection area.

The stern-end electrical system section and the bow-end electrical system section of the second electrical system are advantageously arranged in adjacent compartments in the midships, second vessel protection area.

Advantageously, again arranged spatially separate therefrom is a third electrical system with two air-breathing PEM fuel cells in a third vessel protection area, arranged between the second, midships, vessel protection area and a bow-end vessel protection area, preferably close to the transition to the midships, second vessel protection area.

A first diesel reformer center with a diesel reformer can be arranged in the midships, second vessel protection area, in which case it may preferably be located in that compartment in the second vessel protection area in which the bow-end electrical system section of the second electrical system is also provided.

A second diesel reformer center with a diesel reformer is arranged separately from this, to be precise in the third vessel protection area, which is arranged between the midships, second vessel protection area and the bow-end vessel protection area, preferably close to the transition to the bow-end vessel protection area.

The POD propulsion segments of the "frigate" vessel-type equipment system are advantageously designed for its travel at a cruise speed of up to approximately 22 knots and, in this operating state, are supplied with electrical power by means of the fuel cell segments.

In contrast, the water jet propulsion segments are, according to a further advantageous embodiment of the "frigate" vessel-type equipment system according to the invention, designed for its travel at top speed which, for example, may be a speed of approximately 26 knots, and, in this operating state, are supplied with electrical power by means of the two generators.

For low-emission acceleration of the waterjet propulsion segments, they can advantageously be supplied with electrical power from at least one fuel cell segment until the power limit of the fuel cell segment or segments is reached.

In order to optimize the speed which the "frigate" vessel-type equipment system can achieve, and its power consumption, the electrical power which is produced by means of the power generator segment is expediently distributed for optimized efficiency by means of the power distribution segment and energy management for an automation carrier system vessel when the POD propulsion segments and the waterjet propulsion segments are being operated simultaneously, when speeds of more than 30 knots can be achieved.

The power distribution segment of the "frigate" vessel-type equipment system is advantageously subdivided into a propulsion network which is fed from fuel cells and by means of which the POD propulsion segments can be supplied with electrical power, and a generator-fed propulsion network, by which the waterjet propulsion segments can be supplied with electrical power.

The propulsion network which is fed from fuel cells advantageously has a stern-end network section which is essentially associated with the stern-end first vessel protection area, and a bow-end network section, which is essentially associated with the third vessel protection area and which can be connected to the stern-end network section via suitable coupling elements.

According to a further advantageous embodiment of the "frigate" vessel-type equipment system according to the invention, its generator-fed propulsion network is essentially associated with the midships, second vessel protection area and can be connected to the propulsion network which is fed from fuel cells by way of suitable coupling elements. This considerably increases the survivability of both the power generator segment and of the propulsion segment of the "frigate" vessel-type equipment system which is supplied with electrical power from it.

If an auxiliary propulsion system which is arranged in the bow-end vessel protection area can be supplied with electrical power by way of the bow-end network section of the propulsion network which is fed from fuel cells, this auxiliary propulsion system in conjunction with the thruster segment (which is arranged in the bow end) of the propulsion system can ensure that the "frigate" vessel type equipment system according to an embodiment of the invention still remains mobile and maneuverable when heavily damaged, even if at a comparatively low speed.

Further on-board network loads such as weapon system units in the "frigate" vessel-type equipment system according to an embodiment of the invention can advantageously be supplied with electrical power from the entire power generator segment by way of the propulsion network which is fed from fuel cells.

In order to connect the existing vessel operating engineering to the two propulsion networks, it may be expedient to provide low-voltage electrical systems which are arranged in different vessel protection areas, are connected to the respectively associated propulsion network and that can be connected to one another by means of suitable coupling elements.

In order to optimize the operation of the power generator segment, the power distribution segment and the propulsion segment of the "frigate" vessel-type equipment system, its automation segment, which is in the form of an automation carrier system vessel, advantageously has an automation center, which has a large number of terminals and a terminal bus, and two or more servers, which are connected to the terminal bus and to a system bus and to which control network which are associated with different vessel protection areas are connected.

A first control network, which is essentially associated with the stern-end, first vessel protection area, is expediently used to control and to monitor the two POD propulsion segments, the two fuel-cell segments arranged in the stern area, the diesel reformer arranged in the stern area and the vessel operating engineering which is provided in the stern-end first vessel protection area.

A second control network, which is essentially associated with the midships second vessel protection area, can be used to control and to monitor the two generators, the two waterjet propulsion segments and the vessel operating engineering which is provided in the midships, second vessel protection area.

In a corresponding manner, a third control network, which is essentially associated with the third and the bow-end vessel protection area, can be used to control and monitor the two fuel-cell segments which are arranged in the bow area, the diesel reformer which is arranged in the bow area, the thruster segments and the vessel operating engineering which is provided in the third and bow-end vessel protection area.

BRIEF DESCRIPTION OF THE DRAWINGS

The invention will be explained in more detail in the following text using one example embodiment and with reference to the drawings, in which.

DETAILED DESCRIPTION OF THE EXAMPLE EMBODIMENTS

Figure 1:
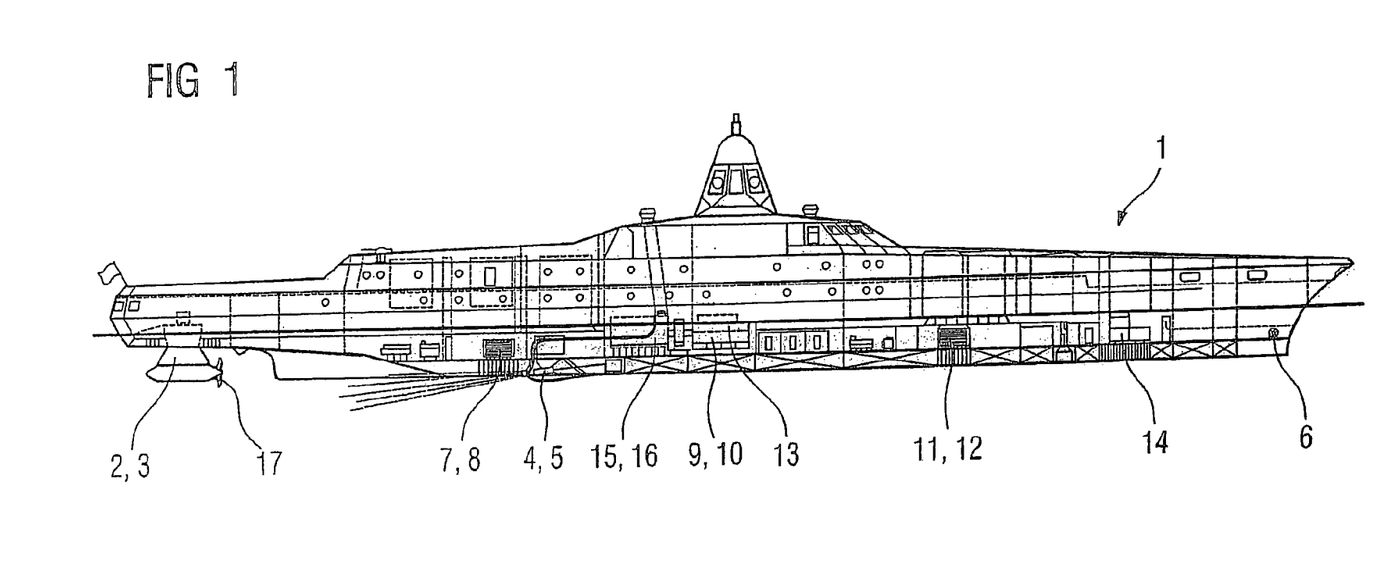
FIG. 1 shows a longitudinal section illustration of one embodiment of a "frigate" vessel-type equipment system according to the invention.
Figure 2:
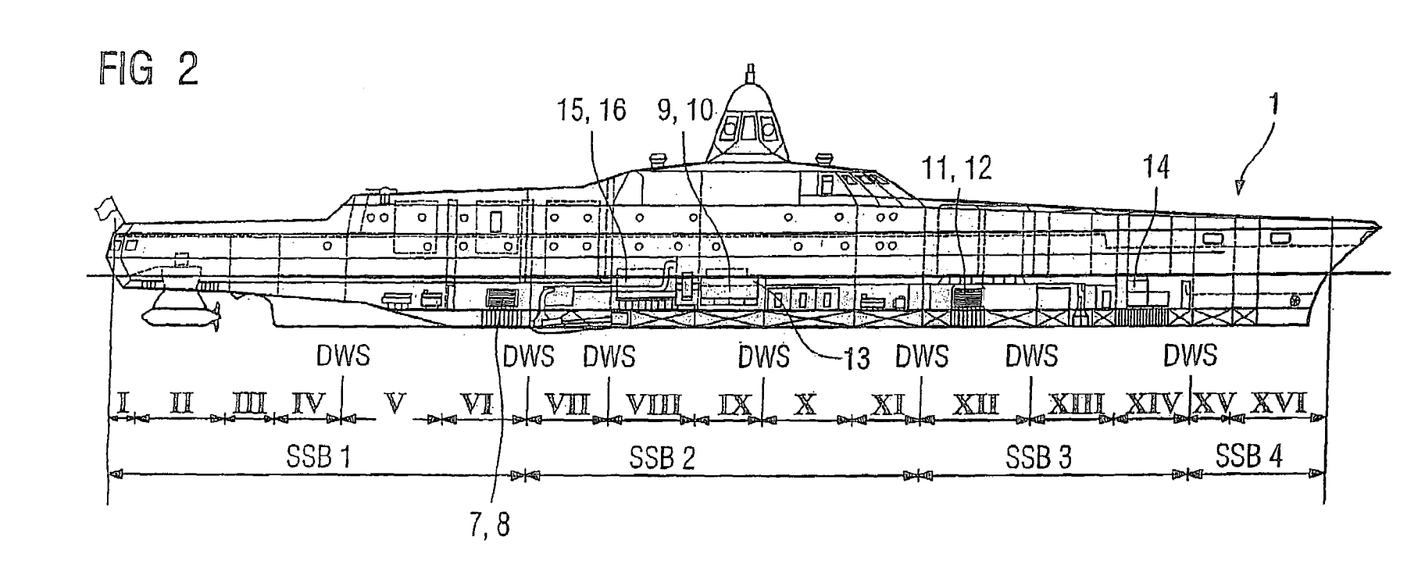
FIG. 2 shows an illustration, corresponding to FIG. 1, of the "frigate" vessel-type equipment system according to an embodiment of the invention, with its vessel protection areas and compartments.

One embodiment of a "frigate" vessel-type equipment system according to the invention, as illustrated in the form of a longitudinal section illustration in FIGS. 1 and 2, has a vessel hull 1 which is designed and has dimensions corresponding to the "frigate" vessel-type equipment system.

In the illustrated exemplary embodiment, the "frigate" vessel-type equipment system has an overall length of approximately 138 m, a keel waterline length of approximately 132 m, an overall width of approximately 17.5 m, a keel waterline width of approximately 16.7 m, a design draft of approximately 4.95 m, a maximum draft of 6.5 m, a type displacement of approximately 5500 tonnes, and a maximum speed of more than approximately 30 knots.

Standard equipment segments, such as a power generator segment, a power distribution segment, a propulsion segment and an automation segment including standard units and components are arranged in the vessel hull 1, in accordance with the requirements for the "frigate" vessel-type equipment system.

The individual units by which the segments are formed or from which they are composed are designed as standardized units which can be prefabricated. Instead of being used in the "frigate" vessel-type equipment system described in the following text, they can also be used in conjunction with other vessel-type equipment systems.

In the illustrated embodiment of a "frigate" vessel-type equipment system, with its type displacement of approximately 5500 tonnes and an assumed maximum speed of more than 30 knots, the propulsion segment includes two POD propulsion segments 2, 3 and two waterjet propulsion segments 4, 5. Together these form a so-called COPAW (Combined Pod and Waterjet) propulsion system which, furthermore, is designed to be completely electrical. The propulsion segment also includes a thruster segment 6, which is arranged close to the bow of the vessel hull 1.

The two POD propulsion segments 2, 3 are lightweight POD propulsion systems designed for naval purposes and each having a power of 7 MW. These POD propulsion segments 3, 4 allow the "frigate" vessel-type equipment system to travel at a cruise speed of up to 22 knots, thus providing a low-noise and low-emission continuous cruise speed.

The two lightweight POD propulsion systems 2, 3 are each equipped with an electric motor with windings composed of high-temperature superconductors. This allows a weight of 65 tonnes per POD propulsion segment 2, 3 to be achieved for the power of 7 MW produced by each POD propulsion segment 2, 3.

The electrical power for the two POD propulsion segments 2, 3 is produced by fuel cell segments 7, 8, 11, 12, which will be described later. These fuel-cell segments 7, 8, 11, 12 are designed for the speed range described above.

In the course of current investigations, it has been found that a propulsion profile appropriate for the continuous cruise speed described above can be maintained over approximately 80% of the lifetime or time-in-motion of the "frigate" vessel-type equipment system.

For the speed range above 22 knots, the propulsion segment has the two waterjet propulsion segments 4, 5 mentioned above. Each of these two waterjet propulsion segments 4, 5 is in the form of a twin-waterjet propulsion system, in the illustrated exemplary embodiment in the form of a twin-waterjet propulsion system with a power of 14 MW. The two twin-waterjet propulsion systems 4, 5 allow the "frigate" vessel-type equipment system to reach a speed of up to 26 knots. Each of the two twin-waterjet propulsion systems 4, 5 has two electric motors with windings composed of high-temperature superconductors and each with a power of 7 MW. The electrical power for operation of the two twin-waterjet propulsion systems 4, 5 is produced by two generators 9, 10, which will be described later.

The propulsion profile with the "frigate" vessel-type equipment system traveling at a speed of more than 22 knots and up to 26 knots is used for about 15% of the lifetime or time-in-motion of the "frigate" vessel-type equipment system.

In a speed range which is above 26 knots and may extend up to above 30 knots, the two POD propulsion segments 2, 3 are connected to the two waterjet propulsion segments 4, 5. In this operating state, both the two generators 9, 10 and the fuel-cell segments 7, 8, 11, 12, which have already been mentioned above, are used to produce the electrical power, which will also be described later.

The propulsion profile in this maximum speed range is used for approximately 5% of the lifetime or time-in-motion of the "frigate" vessel-type equipment system.

The energy generator segment of the "frigate" vessel-type equipment system described above is based on gross power generation of approximately 56 MW for the entire on-board electrical power supply. The net power level of approximately 46 MW which results from this is used for operation of the COPAW propulsion system described above which requires approximately 42 MW for top speed in the maximum speed range above 30 knots, with approximately 2 MW being required for on-board operation including the weapon and electronic systems, with a margin being provided of 2 MW for retrofits, for example with non-lethal or high-energy laser weapons etc.

The power generator segment includes the four fuel-cell segments 7, 8, 11, 12, which have already been mentioned above, and the generators 9, 10. Furthermore, high-power batteries, which are not illustrated in the figures, can be associated with the power generator segment and produce an energy capacity whose power is sufficient to start up the fuel-cell segments 7, 8, 11, 12.

The fuel-cell segments 7, 8, 11, 12 are in the form of air-breathing PEM fuel cells. Each of the four PEM fuel cells 7, 8, 11, 12 has a net power of approximately 4.5 MW, which corresponds to a gross power of approximately 6 MW. The air-breathing PEM fuel cells 7, 8, 11, 12, which are arranged in the stern area and in the bow area in the vessel hull, are used to provide electrical power for the low-noise and environmentally friendly operating state up to a speed of approximately 22 knots, in which the two POD propulsion segments 2, 3 are supplied with electrical power from the PEM fuel cells 7, 8, 11, 12 which have been mentioned.

Two diesel reformers 13, 14 are provided for supplying hydrogen to the fuel-cell segments 7, 8, 11, 12. Each of these two diesel reformers 13, 14 has a power of approximately 9 MW.

The two generators 9, 10 of the power generator segment are each driven by means of a gas turbine 15, 16. The two generators 9, 10 are in the form of three-phase generators with windings composed of high-temperature superconductors, and each have a power of approximately 16 MW, which is sufficient to supply electrical power to the four electric motors for the two twin-waterjet propulsion systems 4, 5. The use of windings composed of high-temperature superconductors allows the generators 9, 10 to have considerably smaller physical sizes and weights than conventionally produced generators of the corresponding power class.

As can be seen in particular from FIG. 2, the vessel hull 1 of the "frigate" vessel-type equipment system is subdivided, in the embodiment illustrated here, into four vessel protection areas, specifically the stern-end, first vessel, protection area SSB-1, the midships, second vessel-protection area SSB-2, the third vessel protection area SSB-3, and the bow-end, fourth vessel protection area SSB-4.

The first vessel protection area SSB-1, in the illustrated exemplary embodiment of the "frigate" vessel-type equipment system, includes the compartments I-VI. The second vessel protection area SSB-2 includes the compartments VII-XI. The third vessel protection area SSB-3 further includes the compartments XII-XIV. Finally, the fourth vessel protection area SSB-4 includes the compartments XV and XVI.

In the illustrated exemplary embodiment of the "frigate" vessel-type equipment system, the two lightweight POD propulsion systems 2, 3 are arranged in the first vessel protection area SSB-1, that is to say astern the vessel, approximately at frame 7.5 and approximately 5.5 m from the center of the ship, to be precise in the compartment II.

The distance between the center of the lightweight POD propulsion systems 2, 3 and the noses of the traction propellers 17 of the two lightweight POD propulsion systems 2, 3 on the one hand and the water outlet openings of the pods of the two twin-water jet propulsion systems 4, 5 on the other hand, is—seen in the longitudinal direction of the vessel hull 1—approximately 35 m and approximately 32 m, respectively.

In the stern area of the vessel, the structure of the vessel hull 1 as far as frames 26 and 27 is designed to correspond to the weights of the two lightweight POD propulsion systems 2, 3, which each weigh about 65 tonnes, with the additional weights for converters, controllers, etc. which are associated with the two lightweight POD propulsion systems 2, 3 of approximately 20 to 30 tonnes being added to this, that is to say a total weight, which must be added to the two lightweight POD propulsion systems 2, 3, of approximately 150 to 160 tonnes, is taken into account. Furthermore, the design of the stern area of the vessel hull 1 must take account of the fact that it must have the strength to absorb the axial forces which occur during operation of the two lightweight POD propulsion systems 2, 3.

The weight of approximately 150 to 160 tonnes, which is installed in the aft area of the vessel as a result of the two lightweight POD propulsion systems 2, 3 that are installed there is compensated for, in terms of weight, by the arrangement of correspondingly heavy equipment modules, for example a 32-cell missile launcher, in the bow area of the vessel. There is therefore no need to broaden the vessel hull 1 in the stern area of the vessel. This optimum arrangement of the standard equipment segments makes it possible to achieve an advantageous vessel configuration. This results in an advantageous drag characteristic of the vessel shape, and the propulsion power for the speeds which are required is reduced at the same time.

The fuel-cell segments 7, 8, 11, 12, the generators 9, 10, the gas turbines 15, 16 and the diesel reformers 13, 14 which make up the power generator segment of the "frigate" vessel-type equipment system are arranged in three separately arranged electrical systems, distributed in the vessel hull 1.

A first electrical system comprises the two fuel-cell segments 7, 8 which are arranged in the stern area, and is arranged in the compartment VI in the stern-end, first vessel protection area SSB-1.

The two gas turbines 15, 16, which are connected via step-down gearboxes to the two generators 9, 10, form a second electrical system together with them, which is subdivided into a stern-end electrical system section with the two gas turbines 15, 16, and a bow-end electrical system section with the two generators 9, 10. The stern-end electrical system section which has the two gas turbines 15, 16 also includes the step-down gearbox and is arranged in the midships, second vessel protection area SSB-2, to be precise in its compartment VIII; the bow-end electrical system section, which accommodates the two generators 9, 10 is arranged in the adjacent compartment IX in the same vessel protection area SSB-2. The compartments VIII and IX may be protected by double-walled bulkheads.

A third electrical system includes the two fuel-cell segments 11, 12, which are arranged in the bow area and are likewise in the form of air-breathing PEM fuel cells. This third electrical system is arranged in the third vessel protection area SSB-3, which is arranged between the midships, second vessel protection area SSB-2 and the bow-end, fourth vessel protection area SSB-4, to be precise in its compartment XII.

A first diesel reformer center, in which the diesel reformer 13 which is arranged in the stern area is arranged, is arranged together with the bow-end electrical system section for the second electrical system in the compartment IX in the midships, second vessel protection area SSB-2. A further diesel reformer center, which accommodates the diesel reformer 14 that is arranged in the bow area, is arranged in the compartment XIV of the third vessel protection area SSB-3. The physical distribution of the three electrical systems and of the two diesel reformer centers in three different vessel protection areas results in the "frigate" vessel-type equipment system having maximum survivability.

It should be noted that the two diesel reformers 13, 14 are arranged in those areas of the vessel hull 1 whose height normally corresponds to two deck levels, since, nowadays, diesel reformers 13, 14 such as these have a height of approximately 3.5 m.

The physical separation of the two POD propulsion system segments 2, 3 from one another and from the two waterjet propulsion segments 4, 5, which are themselves physically separated from one another, in conjunction with the redundant power supply by means of the three above-described electrical systems, which are distributed between three vessel protection areas SSB-1, SSB-2 and SSB-3 and accommodate the four fuel cell segments 7, 8, 11, 12 and the two gas-turbine-powered generators 9, 10, results in a considerable improvement in the survivability of the propulsion segment of the "frigate" vessel-type equipment system.

Any desired control and steering maneuvers can be carried out by way of the two POD propulsion segments 2, 3 and/or by means of the two waterjet propulsion systems 4, 5, in particular in conjunction with the thruster segment 6, which is in the form of a 0.5 MW bow jet thruster.

Both the two POD propulsion segments 2, 3 and the two waterjet propulsion systems 4, 5 have continuously variable power outputs. Stopping and astern maneuvers can be provided not only by thrust vectoring of the waterjet propulsion systems 4, 5 but also by rotation of the POD propulsion segments 2, 3.

Figure 3:
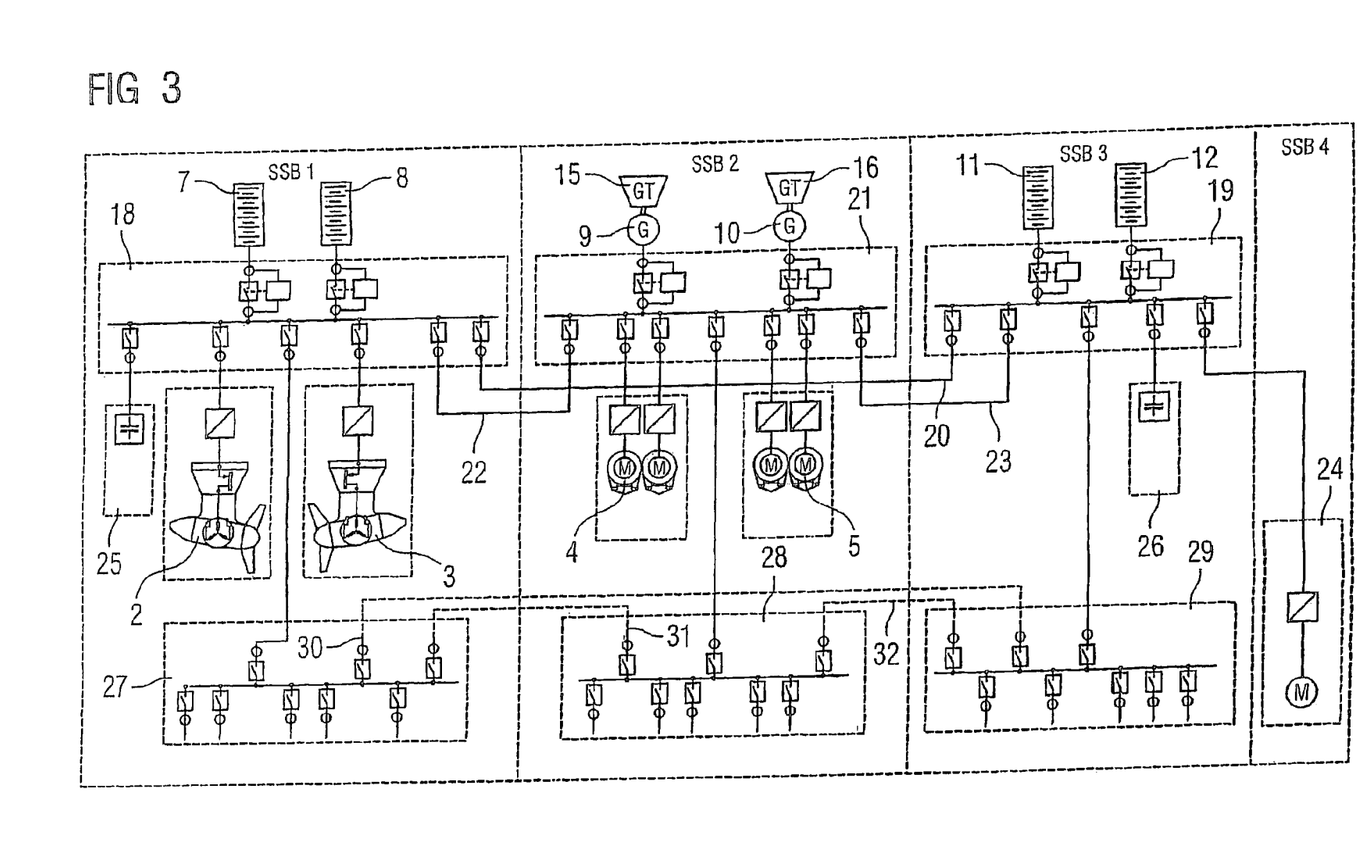
FIG. 3 shows an outline illustration of the power distribution and of the on-board power supply for the "frigate" vessel-type equipment system according to an embodiment of the invention as illustrated in FIGS. 1 and 2.

The combination of the power generation from the fuel-cell segments 7, 8, 11, 12 and from the gas-turbine-powered generators 9, 10, and the inclusion of two different voltage systems, which results from this, in a DC network and an AC network results in the power distribution segment, as shown in FIG. 3, having the following configuration:

The power distribution segment includes a propulsion network 18, 19 which is fed from fuel cells and which, in the illustrated exemplary embodiment as is shown in FIG. 3, is subdivided into a stern-end network section 18 and a bow-end network section 19.

The stern-end network section 18 is essentially associated with the stern-end, first vessel protection area SSB-1. When the "frigate" vessel-type equipment system is traveling at a cruise speed of up to 22 knots, the two POD propulsion segments 2, 3 are supplied with electrical power by this network section 18 and by the bow-end network section 19. The two fuel-cell segments 7, 8 which are arranged in the stern area in the first electrical system feed the network section 18. The two fuel-cell segments 11, 12 which are arranged in the third electrical system feed the bow-end network section 19.

The two network sections 18, 19 of the propulsion network which is fed from fuel cells can be connected to one another via suitable coupling elements 20.

Furthermore, a generator-fed propulsion network 21 is provided, and is essentially associated with the midships, second vessel protection area SSB-2. The generators 9, 10, which are provided in the second electrical system, feed this second propulsion network. The generator-powered propulsion network 21 is used in the "frigate" vessel-type equipment system speed range between 22 knots and approximately 26 knots to supply electrical power to the two waterjet propulsion segments 4, 5. The generator-powered propulsion network 21 can be connected by means of suitable coupling elements 22, 23 to the two network sections 18, 19 of the propulsion network which is powered by fuel cells.

An auxiliary propulsion system 24, which is arranged in the bow-end vessel protection area SSB-4, is supplied with electrical power by means of the propulsion network which is powered by fuel cells, in particular by its bow-end network section 19. The thruster segment 6 is driven by means of the auxiliary propulsion system 24. In one possible refinement of the thruster segment 6, for example in the form of a retractable stirring propeller with the functions of a so-called "coming home" propulsion system, in which this is adequate in the event of failure of the other units in the propulsion segment, to move and to maneuver the "frigate" vessel-type equipment system at a comparatively low speed in specific circumstances.

Furthermore, FIG. 3 shows a weapon system unit 25, which is arranged in the stern area, and a weapon system unit 26, which is arranged in the bow area, which units are associated with the vessel protection areas SSB-1 and SSB-3, respectively, and are supplied with electrical power as appropriate from the stern-end network section 18 and, respectively, from the bow-end network section 19 of the propulsion network which is powered by fuel cells.

Furthermore, a low-voltage electrical system 27, 28, 29 is provided in each of the vessel protection areas SSB 1, SSB-2 and SSB-3, respectively. The low-voltage electrical system 27 which is provided in the stern-end, first vessel protection area SSB-1 is connected directly to the stern-end network section 18, while the low-voltage electrical system 29 which is provided in the third vessel protection area SSB-3 is connected directly to the bow-end network section 19 of the propulsion network 18 which is powered by fuel cells; the low-voltage electrical system 28 which is arranged in the midships, second vessel protection area SSB-2 is connected directly to the generator-powered propulsion network 21.

The two low-voltage electrical systems 27 and 29 are connected to one another and to the low-voltage electrical system 28 by means of suitable coupling elements 30, 31 and 32, respectively.

Figure 4:
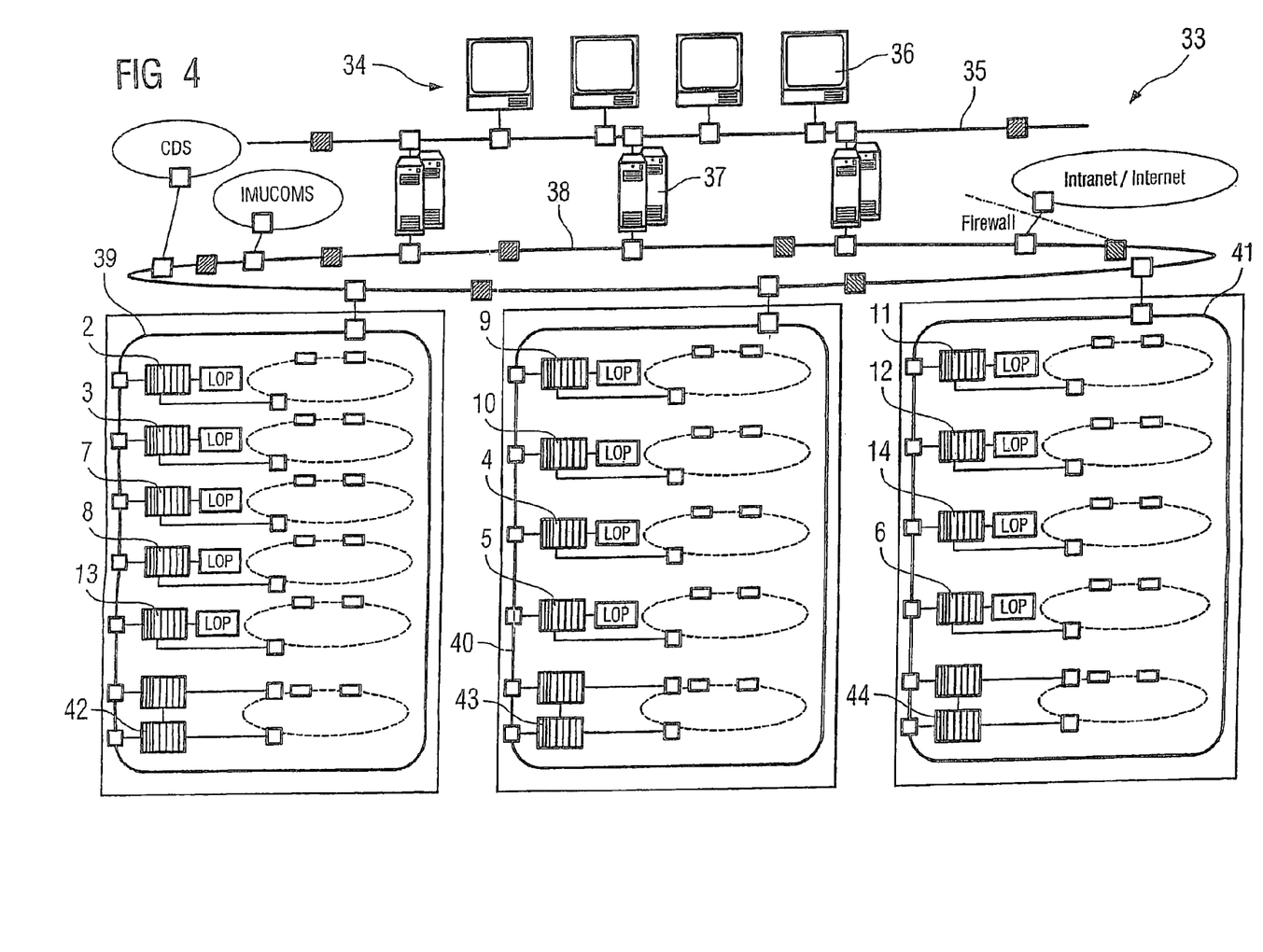
FIG. 4 shows an automation center for the "frigate" vessel-type equipment system according to an embodiment of the invention, as illustrated in FIGS. 1 and 2.

Intelligent energy management is provided in order to make it possible to provide the power distribution of the electrical power that is required by the COPAW propulsion system, between the two POD propulsion segments 2, 3 and the two waterjet propulsion segments 4, 5 based on optimized efficiency, which intelligent energy management is provided by the automation carrier system vessel 33, which is shown in principle in FIG. 4 and forms the automation segment of the "frigate" vessel-type equipment system. This automation carrier system vessel 33 includes an automation center 34 which, in the illustrated exemplary embodiment, has four terminals 36 which are connected to one another via a terminal bus 35. This terminal bus 35 is connected to two or more redundant servers 37, which are connected on the other side to a system bus 38. The servers have access via the system bus 38 to control networks 39, 40, 41, of which there are three in the illustrated exemplary embodiment, and of which the control network 39 is associated with the first vessel protection area SSB-1, the control network 40 is associated with the midships second vessel protection area SSB-2, and the control network 41 is associated with the vessel protection areas SSB-3 and SSB-4.

The two POD propulsion segments 2, 3, the two fuel-cell segments 7, 8 which are arranged in the first electrical system in the stern area, the diesel reformer 13 which is arranged in the stern area and the vessel operating engineering 42, which is provided in the stern-end first vessel protection area SSB-1, are controlled and monitored by way of the control network 39.

The two gas-turbine-powered generators 9, 10 in the second electrical system, the two waterjet propulsion segments 4, 5 and the vessel operating engineering 43 which is provided in the midships, second vessel protection area SSB-2 are controlled and monitored by way of the control network 40.

The two fuel-cell segments 11, 12 which are arranged in the third electrical system in the bow area, the diesel reformer 14 which is arranged in the bow area, the thruster segment 6 and the vessel operating engineering 44, which is provided in the third vessel protection area SSB-3 and in the bow-end vessel protection area SSB-4, are controlled and monitored in a corresponding manner via the control network 41.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A frigate vessel-type equipment system, comprising;
    a vessel hull, matched to a frigate vessel-type equipment system on a size and requirement-specific basis; and
    standard equipment segments including a power generator segment, a power distribution segment, a propulsion segment and an automation segment, at least one of the standard segments being formed from standard units and components arranged in accordance with the requirements in the vessel hull of the frigate vessel-type equipment system, and installable in vessel hulls of different vessel-type equipment systems, wherein the standard equipment segments are distributable across various portions of the vessel hull, wherein the automation segment includes an automation center which has a large number of terminals and a terminal bus, and has two or more servers which are connected to the terminal bus and to a system bus, and to which control networks which are associated with different vessel protection areas are connected.

2. The frigate vessel-type equipment system as claimed in claim 1, including a first control network which is essentially associated with the stern-end, first vessel protection area and with which the two POD propulsion segments, two fuel-cell segments of the power generator segment which are arranged astern, a diesel reformer of the power generator segment which is arranged astern, and the vessel protection engineering which is provided in the stern-end, first vessel protection area are associated.

3. The frigate vessel-type equipment system as claimed in claim 2, including a second control network, which is essentially associated with a midships, second vessel protection area and with which two generators of the power generator segment, the two waterjet propulsion segments and the vessel operating engineering, which is provided in the midships, second vessel protection area, are associated.

4. The frigate vessel-type equipment system as claimed in claim 1, including a third control network, which is essentially associated with a third vessel protection area and the bow-end vessel protection area and with which two fuel cell segments of the power generator segment which is arranged in the bow, a diesel reformer of the power generator segment, which are arranged in the bow, a thruster segment of the propulsion segment and the vessel operating engineering which is provided in the third vessel protection area and in a bow-end vessel protection area are associated.

5. A frigate vessel-type equipment system compromising:
    a vessel hull, matched to the frigate vessel-type equipment system on a size and requirement-specific basis; and
    standard equipment segments including a power generator segment, a power distribution segment, a propulsion segment and an automation segment, at least one of the standard segments being formed from standard units and components arranged in accordance with the requirements in the vessel hull of the frigate vessel-type equipment system, and installable in vessel hulls of different vessel-type equipment systems, wherein the standard equipment segments are distributable across various portions of the vessel hull, the power generator segment includes a first electrical system, which is subdivided into a stern-end electrical system section with two gas turbines and a bow-end electrical system section with generators, is arranged in a midships, second vessel protection area.

6. The frigate vessel-type equipment system as claimed in claim 5, wherein the stern-end electrical system section and the bow-end electrical system section of the second electrical system are arranged in adjacent compartments in the midships, second vessel protection area.

7. The frigate vessel-type equipment system as claimed in claim 5, wherein a third electrical system having two air-breathing PEM fuel cells is arranged in a third vessel protection area, which is arranged between a second, midships vessel protection area and a bow-end vessel protection area.

8. The frigate vessel-type equipment system as claimed in claim 5, wherein a first diesel reformer center with a diesel reformer is arranged in a midships, second vessel protection area, in a component which accommodates a bow-end electrical system section of the second electrical system.

9. The frigate vessel-type equipment system as claimed in claim 5, wherein a second diesel reformer center with a diesel reformer is arranged in a third vessel protection area, which is arranged between a midships, second vessel production area and a bow-end vessel protection area.

* * * * *